United States Patent [19]
Ollery

[11] 4,034,637
[45] July 12, 1977

[54] DOUBLE ROTOR SHEAR

[76] Inventor: Daniel Ollery, 9, Allee Niepce, Bouffemont Moiselles, France, 95570

[21] Appl. No.: 674,271

[22] Filed: Apr. 6, 1976

[30] Foreign Application Priority Data

July 4, 1975 France .............................. 75.10781

[51] Int. Cl.² ................. B23D 25/08; B23D 25/12; B26D 1/56
[52] U.S. Cl. .................................... 83/341; 83/344
[58] Field of Search ............ 83/341, 343, 344, 345

[56] References Cited
U.S. PATENT DOCUMENTS 2,125,939  8/1938  MacFarren .......................... 83/341
3,570,363  3/1971  Thomas ............................... 83/341
3,703,841  11/1972  Crawford ............................ 83/341

*Primary Examiner*—Donald R. Schran
*Attorney, Agent, or Firm*—Browdy and Neimark

[57] ABSTRACT

A double-rotor shear used to cut materials in strip form has opposing blades arranged to rotate in opposite directions with respect to two parallel axes. The cutting edge of each of the blades is rectilinear and situated in a plane passing through the corresponding axis of rotation at an angle with respect to the axis. At all times during operation the two cutting edges are disposed symmetrically with respect to the plane passing through a line equidistant from the two axes of rotation, which plane is normal to the plane defined by these axes.

2 Claims, 5 Drawing Figures

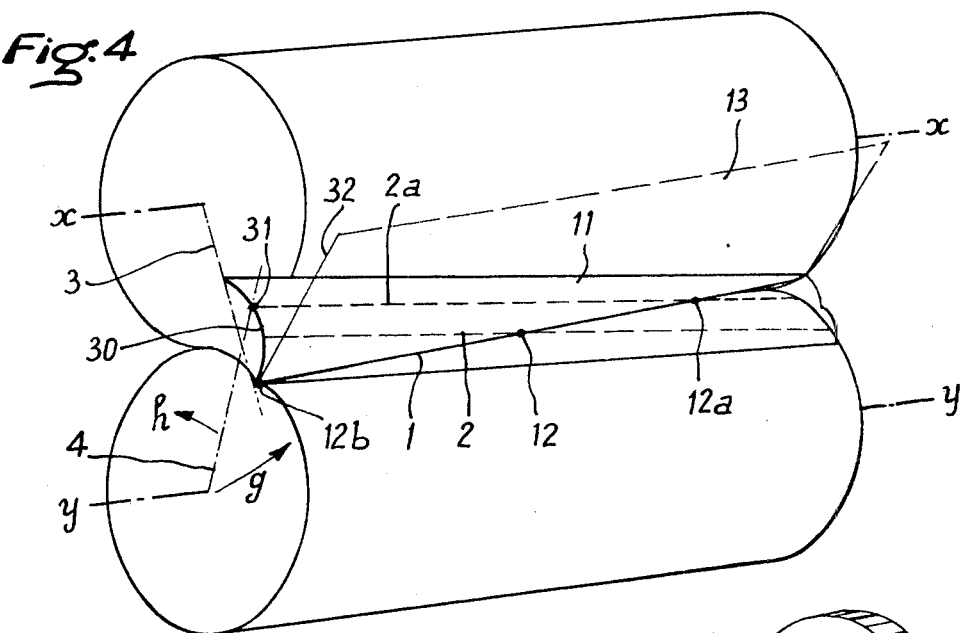
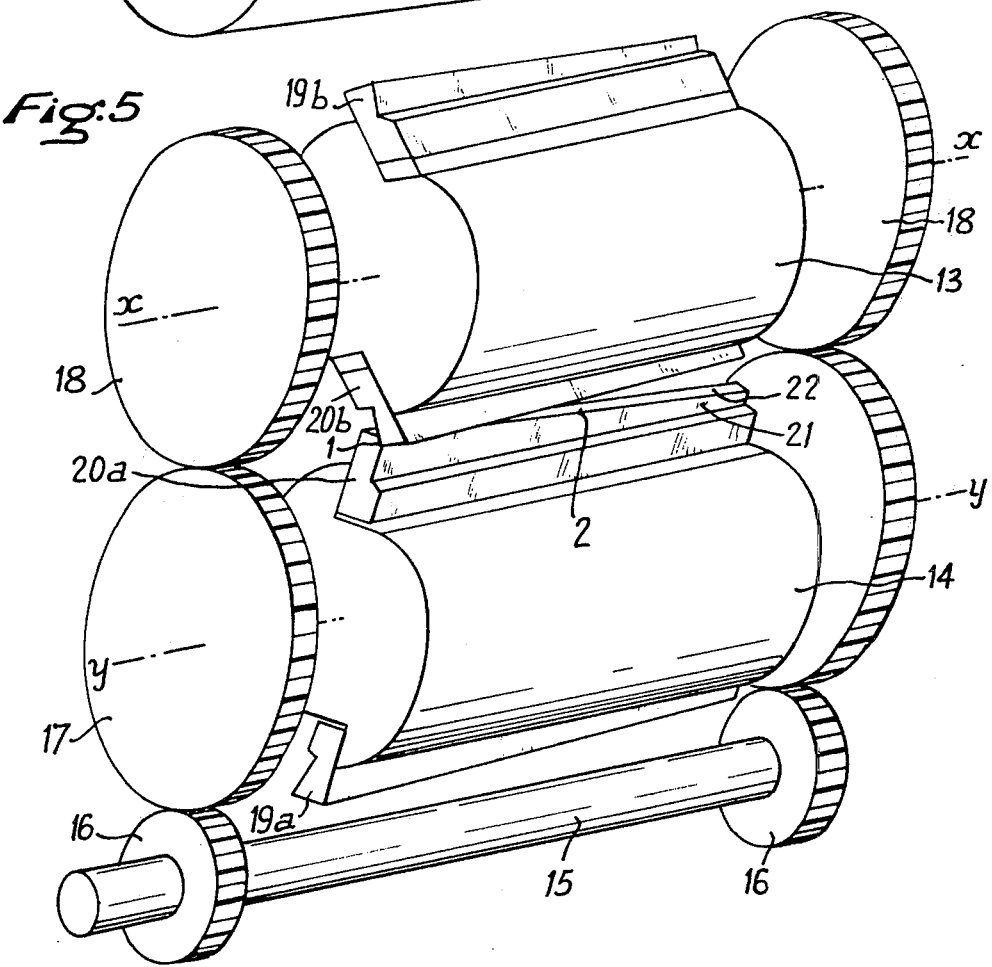

DOUBLE ROTOR SHEAR

FIELD OF THE INVENTION

The present invention relates to double-rotor shears, namely shears with at least a pair of blades arranged to rotate in opposite directions around two parallel axes, and used in particular to cut materials in strip form.

BACKGROUND OF THE INVENTION

Double-rotor shears are known in which the cutting edges of the blades are practically parallel to the two axes of rotation. In this case cutting is effected substantially simultaneously throughout the width of the strip. The instant forces to be supplied by the machine are then large and sudden, cause a very disturbing noise in operation and cause rapid blade wear.

Double rotor shears are also known in which the cutting edge of one of the blades is parallel to the axis of rotation of this blade, while the cutting edge of the other blade is inclined with respect to the corresponding axis of rotation and does not lie in the plane passing through said axis. The two cutting edges thus form an angle with each other, called the cutting angle, such that cutting becomes progressive because the point at which the two cutting edges intersect at any one point in time, or cutting point, moves along these edges as cutting progresses. The instant forces and the noise are considerably reduced. But the cutting point does not remain in the plane of travel of the strip to be cut, and the inclined cutting edge cannot be rectilinear. This cutting edge thus cannot be physically brought about by the intersection of two planes. As a result, not only fabrication of the blade involves delicate and costly machining, but in addition each resharpening of this blade is difficult since a curved surface has to be regenerated.

SUMMARY OF THE INVENTION

The particular aim of the present invention is to remedy these disadvantages of the prior art and it deals with a progressive-cut shear, wherein the cut is always accomplished in the travel plane of the strip, permitting plane machining of the blades.

According to the present invention, the shear of the type specified hereinabove is characterized by the cutting edge of each of the blades being rectilinear and situated in the plane passing through the corresponding axis of rotation and being inclined at a certain angle with respect to this axis, and by the two cutting edges in operation being disposed at each moment in time symmetrically with respect to the plane passing through a straight line equidistant from the two axes of rotation, which plane is normal to the plane defined by these axes.

This ensures both cutting progressivity and symmetry with respect to the travel plane of the strip, provided only that the plane of symmetry of the two cutting edges is chosen for this travel plane.

According to a preferred embodiment, the cutting edge of each blade is created by the intersection of two plane faces of the blade, which considerably simplifies machining the blades and, later, resharpening them.

Other characteristics and advantages of the present invention will emerge from the description hereinbelow.

BRIEF DESCRIPTION OF THE DRAWINGS

The attached drawings, supplied as non-limitative examples, represent a particular embodiment of the present invention.

FIG. 4 is a schematic perspective showing a portion of the surface generated by one of the cutting edges of FIG. 1 in a space related to the other cutting edge.

FIG. 5 is a perspective of the rotating parts of a shear according to the present invention.

DETAILED DESCRIPTION OF A PREFERRED EMBODIMENT

Figure 1:
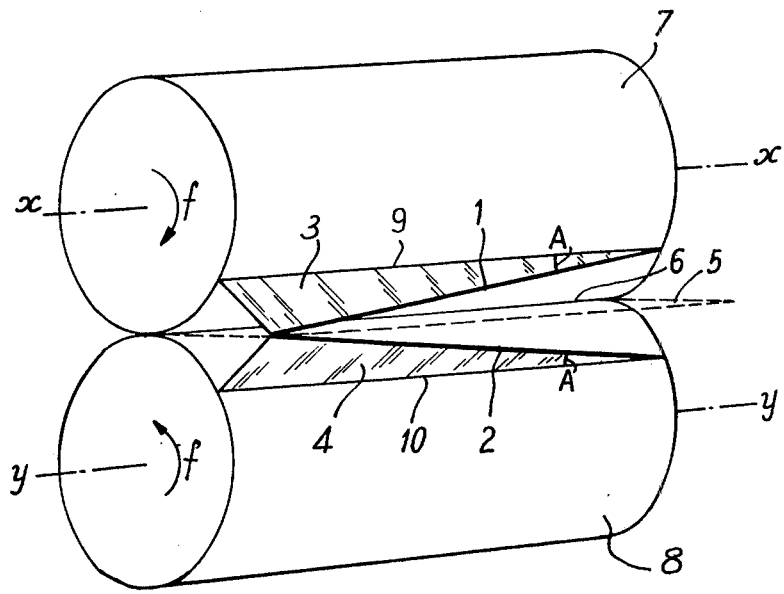
FIG. 1 is a schematic perspective illustrating the position of the cutting edges of the two blades in a machine according to the present invention.
Figure 3:
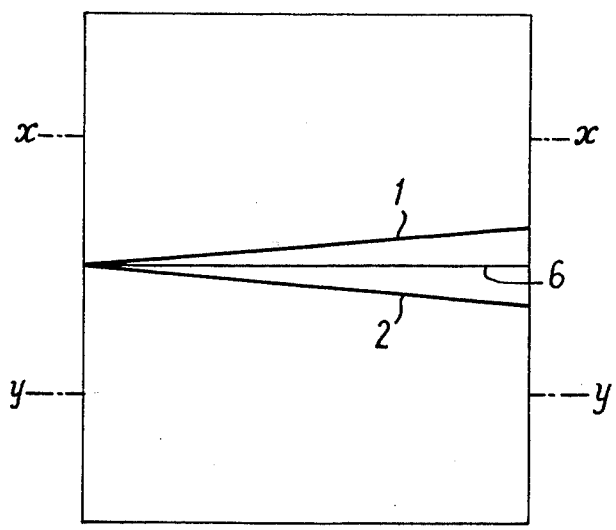
FIGS. 2 and 3 are views corresponding to FIG. 1, but in profile and in elevation, respectively.
Figure 2:
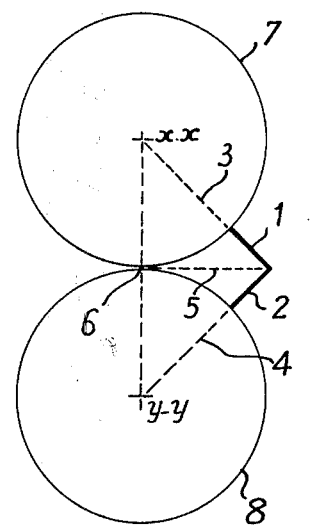

The schematic views of FIGS. 1 to 3 serve principally to define the shape and relative positions of the cutting edges of two blades associated with a two-rotor shear according to the present invention.

These cutting edges 1, 2 are both rectilinear and are rotatably mounted around two fixed shafts $xx$ and $yy$, respectively, which are parallel to one another. The directions of rotation of the two blades about their respective axes are opposite, as shown by arrows $f$.

The position of edges 1, 2 is defined at each point in time as follows:

First, each of the edges 1, 2 is contained in a plane 3, 4 which passes through the corresponding axis of rotation $xx$ or $yy$, respectively.

Secondly, in each of these planes, edges 1, 2 are inclined at the same angle A with respect to the common direction of axes $xx$ and $yy$.

Finally, planes 3 and 4, which during operation rotate about axes $xx$ and $yy$ with angular velocities of the same magnitude and in different directions, are at each instant symmetrical with respect to plane 5 which is normal to the plane defined by the two axes $xx$ and $yy$ and which plane 5 passes through a line 6 equidistant from these two axes.

According to the above, plane 5 is also the plane of symmetry of the two edges 1 and 2. In operation, this plane is chosen as the travel plane of the strip to be cut.

It will be understood that planes 3 and 4 represented are only non-material geometric planes serving to define the position of the edges in space and are not faces of the blades of the shear. Similarly, cylinders 7 and 8 represented in the figures are only non-material surfaces generated by the rotation of lines such as 9 and 10 parallel to the axes of rotation.

FIG. 4 shows a portion of the surface generated by one of the edges, in this case edge 2, in a space linked to another edge 1. To interpret this figure, we can imagine that the upper rotor is immobilized, including edge 1, and that the lower rotor is made to rotate about axis $xx$ with an angular velocity equal and opposite to that which edge 1 in fact has about this same axis $xx$. Under these circumstances, axis $yy$ rotates about axis $xx$ in the direction of arrow $g$.

The useful portion of the surface so generated by edge 2 has been denoted 11, this portion corresponding to a real intersection of edges 1 and 2 and to effective cutting.

Calculation shows that this surface possesses the following important property: if surface 11 is cut by a plane 3 passing through axis $xx$, the intersection is a straight line 1 inclined with respect to axis $xx$.

We can see from the figure that when edge 2 passes to position 2a, generating surface 11, its point of intersection with line 1 passes from 12 to 12a, the first intersection occuring at 12b, which corresponds to the beginning of cutting.

This shows that if a first cutting edge 2 is chosen which is rectilinear and inclined at a certain angle with respect to its axis of rotation $yy$, we obtain a progressive cut, taking as a second cutting edge line 1 which is also inclined at the same angle with respect to its axis of rotation $xx$.

If we denote by 30 the curve described in space linked to edge 1, in the course of cutting by point 31 of edge 2, this point 31 being situated at 12b at the beginning of cutting, it is shown that the useful portion of surface 11 is wholly on one side of a plane 13 which contains both tangent 32 at 12b to curve 30, and line 1.

FIG. 5 shows a sample embodiment of a shear according to the present invention, of which only the blades and blade-holders are drawn in.

The shear includes two rotors 13,14 which rotate respectively about parallel axes $xx$ and $yy$. These rotors are driven rotation-wise by a shaft 15 via two similar sets of gears 16 to 18 disposed on each side of the rotors.

Each of the rotors supports two blades, 19a, 19b and 20a, 20b respectively, in a known manner which is not part of the present invention; blades of the different rotors cooperate two by two, the two blades of the same rotor being symmetrical with respect to the axis of rotation of this rotor. The cutting edges of these blades are rectilinear and positioned as stated above with reference to FIGS. 1 to 3. These edges are realized materially by the intersection of two plane surfaces such as 21 and 22, disposed such as to be outside of and on the same side as, surfaces such as 11 of FIG. 4 to prevent interference between the blades. This is realized by placing plane surface 21 on the side opposite surface 1 with respect to plane 13 defined hereinabove.

The cutting edges of each pair of associated blades being at all times symmetrical with respect to the travel plane of the strip to be cut, their intersection, namely the cutting point, remains in this plane, which prevents any deformation of the strip. Since the edges are rectilinear and defined by the intersection of two planes, machining and resharpening of the blades are simple and inexpensive.

It will be obvious to those skilled in the art that various changes may be made without departing from the scope of the invention and the invention is not to be considered limited to what is shown in the drawings and described in the specification.

What is claimed is:

1. A shear, particularly for materials in strips, the shear comprising:

at least one pair of blades operatively arranged to rotate in opposite directions with respect to two parallel axes of rotation, the cutting edge of each respective one of said blades being rectilinear and situated in a plane passing through the corresponding axis of rotation, being inclined at an angle with respect to said corresponding axis and being defined by the intersection of two plane faces of the corresponding blade, and wherein the two cutting edges of each said pair of blades, when operating, are at all times disposed symmetrically with respect to a given plane which passes through a line equidistant from said two axes of rotation, said given plane being normal to a plane defined by these axes.

2. A shear in accordance with claim 1, further including rotors, generally cylindrical in shape, arranged to rotate respectively about one of the above-mentioned axes of rotation, said blades being mounted on said rotors.

* * * * *